United States Patent
Cedeno

(10) Patent No.: US 8,682,715 B1
(45) Date of Patent: Mar. 25, 2014

(54) GIFT CARD WITH SUBSEQUENT DISCOUNT

(76) Inventor: Neville Cedeno, Wellington, FL (US)

(*) Notice: Subject to any disclaimer, the term of this patent is extended or adjusted under 35 U.S.C. 154(b) by 39 days.

(21) Appl. No.: 13/326,646

(22) Filed: Dec. 15, 2011

Related U.S. Application Data

(60) Provisional application No. 61/424,210, filed on Dec. 17, 2010.

(51) Int. Cl.
*G06Q 10/00* (2012.01)
*G06Q 30/02* (2012.01)

(52) U.S. Cl.
CPC .................................. *G06Q 30/0207* (2013.01)
USPC ...................................... 705/14.1; 705/14.38

(58) Field of Classification Search
USPC ............................................ 705/14.1, 14.38
See application file for complete search history.

(56) References Cited

U.S. PATENT DOCUMENTS

| | | | |
|---|---|---|---|
| 6,370,514 B1 | 4/2002 | Messner | |
| 7,240,843 B2 | 7/2007 | Paul et al. | |
| 7,303,121 B2 | 12/2007 | Martinez | |
| 7,644,859 B1 | 1/2010 | Zhu | |
| 7,711,620 B2 | 5/2010 | Abifaker | |
| 8,167,199 B1 * | 5/2012 | Voutour | 235/380 |
| 2005/0125292 A1 | 6/2005 | Kassab et al. | |
| 2006/0144926 A1 | 7/2006 | Jacobs | |
| 2006/0289631 A1 * | 12/2006 | Stretch et al. | 235/380 |
| 2006/0293953 A1 * | 12/2006 | Nicholson | 705/14 |
| 2007/0017973 A1 | 1/2007 | Blank et al. | |
| 2007/0205267 A1 | 9/2007 | Dennett | |
| 2007/0208618 A1 | 9/2007 | Paintin et al. | |
| 2007/0210152 A1 | 9/2007 | Read | |
| 2007/0288313 A1 | 12/2007 | Brodson | |
| 2008/0099551 A1 | 5/2008 | Harper et al. | |
| 2008/0191006 A1 | 8/2008 | White | |
| 2009/0327067 A1 * | 12/2009 | Berger et al. | 705/14.33 |
| 2010/0299194 A1 * | 11/2010 | Snyder et al. | 705/14.13 |
| 2012/0150643 A1 * | 6/2012 | Wolfe et al. | 705/14.53 |

* cited by examiner

*Primary Examiner* — Johnna Loftis
(74) *Attorney, Agent, or Firm* — Gold & Rizvi, P.A.; Glenn E. Gold

(57) ABSTRACT

A method of redeeming a gift card having an associated programmed monetary value and incentivizing a user to purchase goods and services in an amount exceeding the programmed monetary value includes reading the identity of the gift card presented by a user and associating the gift card with a stored monetary card balance. The purchase amount of the user's desired purchase is determined and then compared with the associated card balance. A balance owing in excess of said associated card balance is calculated and the balance is then discounted by a predetermined percentage. Finally, payment from the user of the discounted balance owing is received. The system can include a registry to enable multiple subsequent discounts for a predetermined number of discounts during future purchases through the merchant or merchants.

19 Claims, 5 Drawing Sheets

GIFT CARD WITH SUBSEQUENT DISCOUNT

CROSS-REFERENCE TO RELATED APPLICATION

This Non-Provisional Utility application claims the benefit of U.S. Provisional Patent Application Ser. No. 61/424,210, filed on Dec. 17, 2010, which is incorporated herein in its entirety.

FIELD OF THE INVENTION

The present disclosure generally relates to apparatuses and methods for gift cards. More particularly, the present disclosure relates to a gift card that offers a discount for amounts spent in excess of the gift card balance.

BACKGROUND OF THE INVENTION

Gift cards have been around since the beginning of the twentieth century and their popularity has virtually exploded since entering the electronic age. A gift card is a restricted monetary equivalent that is typically issued by a retailer to be used as an alternative to a non-monetary gift. Banks also issue gift cards. Gift cards have become increasingly popular since they relieve the donor of selecting a specific gift. Gift cards have ranked as the second-most given gift by consumers in the United States and as the most-wanted gift by women. In 2006 about $80 billion were paid for gift cards in the United States. When used within the restrictions set by the issuing entity, the gift card can be used the same as cash at the discretion of the user. Retailers have gradually used gift cards to replace gift certificate programs in their retail business operations.

Gift cards today typically resemble credit cards in size and appearance. These gift cards usually display a specific theme identifying them with the issuing entity such as a retailer and are identified by a specific number or code, but usually not with an individual name. Thus, the cards can be readily transferred from individual to individual. The cards may have a barcode or magnetic strip which is readable by an electronic credit card machine and some gift cards can be reloaded by payment and can thus be used multiple times. Usually, the cards having an electronically readable identification have no value until sold at which time the cashier enters the monetary value, which a customer wishes to put on the card. This monetary value is rarely stored on the card, but rather is cross-linked in a master database to the card identification. To counteract attempts at counterfeiting a card, the data on the card is encrypted. Other gift cards may have a set value and prior to use need to be activated by calling a specific phone number.

A new trend in gift cards is the use of mobile and virtual gift cards. These cards are delivered to mobile phones via SMS messages and applications resident on smart phones thus permitting users to carry only their cell phones eliminating the need to carry a physical card which can be prone to damage or loss and eliminate the need to drive to a 'brick and mortar' location to purchase the gift card.

One disadvantage of using a gift card is that purchase totals rarely match the programmed value of the gift card. Thus, a user who possessed a gift card will typically makes a purchase that is less than the value of the card, trying to use as much of the value of the card as possible without spending more than the programmed value to avoid having to pay additional cost. However, the retailer or merchant that issues the card usually desires that the value of the user's purchase exceeds the value of the card to increase the volume of sales from a gift card user. However, there is no ready incentive for a user to make purchases in excess of a gift card value. Therefore, a need for a gift card system and method of using a gift card incentivizing a user to make retail purchases in excess of the value of a gift card.

SUMMARY OF THE INVENTION

The present disclosure is generally directed to a method of redeeming a gift card having an associated programmed monetary value and incentivizing a user to purchase goods and services in an amount exceeding the programmed monetary value. The method includes reading the identity of the gift card presented by a user and associating the gift card with a stored monetary card balance. The purchase amount of the user's desired purchase is determined and then compared with the associated card balance. A balance owing in excess of said associated card balance is calculated and the balance is then discounted by a predetermined percentage. Finally, payment from the user of the discounted balance owing is received.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
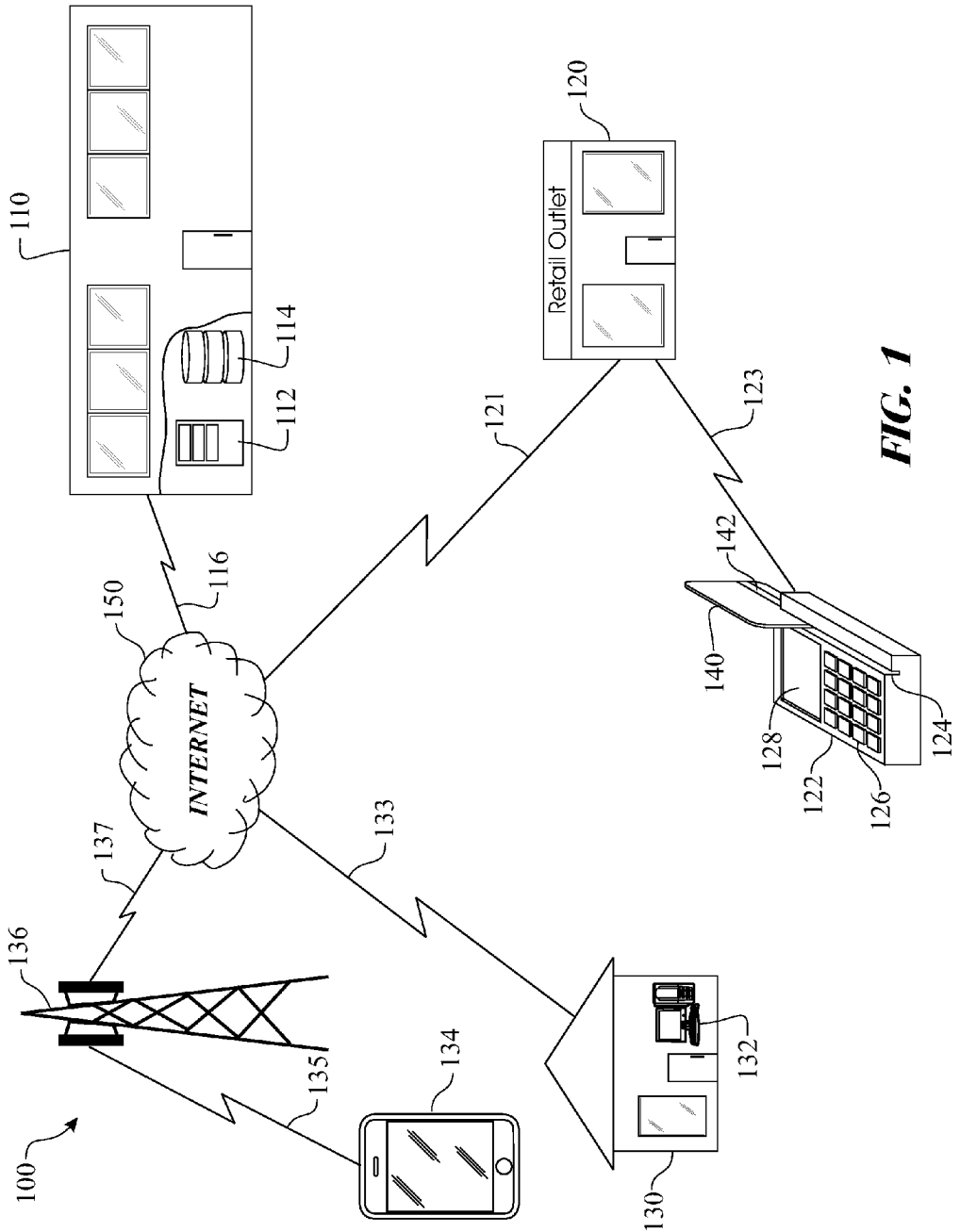
FIG. 1 presents a schematic depiction of a system for redeeming a gift card to incentivize a consumer to purchase in excess of the gift card value.

A gift card redemption system 100, which is one of the preferred embodiments of the present invention and illustrates its various components, is presented in an exemplary schematic illustrated in FIG. 1. The gift card redemption system 100 is based at a retailer's central office 110 of a retail chain, or the central office 110 could also be a single retail establishment for a single non-chain retailer. The retailer central office 110 houses a computer 112 executing an instruction set for tracking and maintaining a data base of gift cards 140 and is further interconnected with a searchable storage medium 114. The computer 112 is also connected to the Internet 150 with a communications link 116 for communicating with entities outside of central office 110.

One or more retail outlets 120 associated with central office 110 are connected to central office 110 through an Internet 150 using an electronic link 121. Each retail outlet 120 has an electronic reader 122 for reading encoded information on a gift card 140. The gift card 140 can have the encoded information recorded on a magnetic strip 142 in a manner well known in the industry. To read the magnetic strip 142, the gift card 140 is passed through a card slot 124 of the electronic reader 122 whereupon the encoded information is translated to electronic signal and transmitted to central office computer 112 via electronic links 121, 123 and via the Internet 150 and electronic link 116. Card electronic reader 122 can also included a keypad 126 and a display screen 128 for entering supplemental data and interacting with central office 110. Those practiced in the art will readily recognize that card electronic reader 122 can take various forms to facilitate compatibility with the method of data contained on gift card 140 such as an optical scanner to read a bar code or other means of optically encoded information. The illustration of electronic reader 122 with the function of magnetic strip reading capability is meant to be illustrative and not limiting.

With the increasing use of virtual and mobile gift cards that do not require the storage of data on a plastic card 140, the gift cards can then be stored in virtual format with the requisite identification data on electronic communication devices with appropriately hosted software. In this manner, retail customers 130, here represented by home pictorials, also possess network terminals 132 such as a personal computer which are communicative with Internet 150 via electronic communication links 133. Alternatively, retail customers 130 can also communicate over Internet 150 utilizing a portable personal electronic device 134 communicative via link 135 of dedicated communications network 136. The hosted software on network terminal 132 or personal electronic device 134 can communicate the necessary identification data via the illustrated communication links 133, 134, 137, and 116 to retail central office 110 to facilitate redemption of the virtual gift card without the necessity of traveling to the 'brick and mortar' retail outlet 120.

Figure 2:
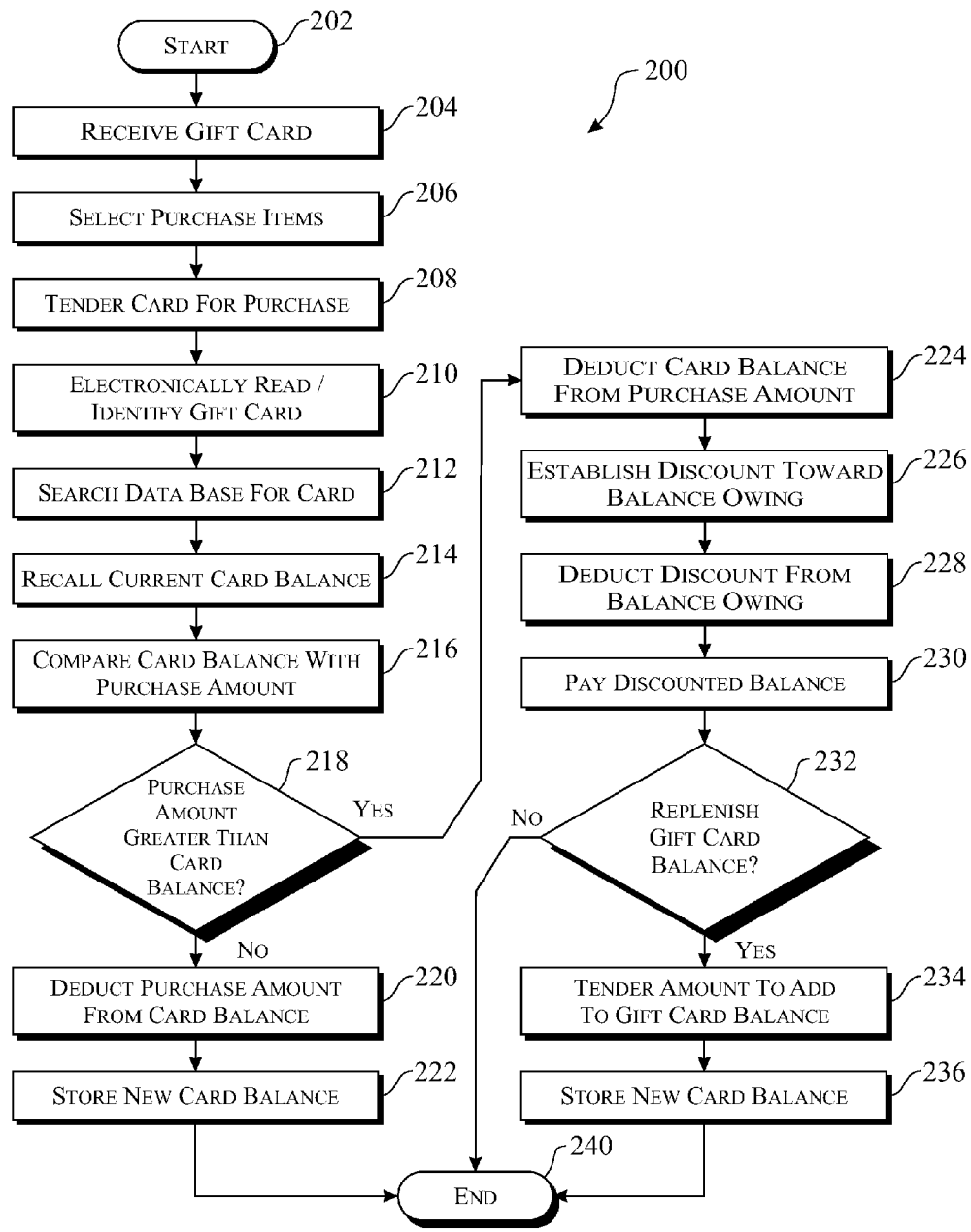
FIG. 2 presents a block diagram representative of a method of redeeming a gift card to incentivize a consumer to purchase in excess of the gift card value.

An exemplary redemption process 200 utilizing the gift card redemption system 100 is presented in the illustration in FIG. 2. The exemplary redemption process 200 illustrates the redemption of the gift card 140 incentivized with offering an added discount for amounts spent in excess of the redemption value of gift card 140. In step 202 the process starts wherein a user receives a gift card 140 with an associated redemption value in block 204. Those practiced in the art will readily recognize that while process 200 is described with respect to a plastic gift card 140 being redeemed at a 'brick and mortar' retail outlet 120, the process is similar for redemption of a virtual gift card hosted on a home computer 132 or personal electronic device 134. The user then selects merchandise items for purchase in block 206 and upon checkout from either retail outlet 140 or from the retailer's Internet web site and tenders gift card 140 as payment for purchase of the items in block 208.

At checkout time when the user is paying for the items purchased, gift card 140 is proffered as payment, such as by swiping through card electronic reader 122, and card 140 is electronically read and identified in block 210. The retail outlet 120 then communicates the data read from card 140 to retail central office computer 112, which in block 212 searches storage medium 114 for data associated with card 140. Once the data associated with card 140 is located on storage medium 114, the current monetary balance of card 140 is recalled in block 214. In block 216, the balance of card 140 is compared with the purchase amount for the items being purchased. If, in block 218, the purchase amount for the items is not greater than the current monetary balance of card 140, the process is directed to block 220 where the purchase amount is deducted from the monetary balance of card 140. The new monetary balance of card 140 is stored in storage medium 114 until the next time the user proffers card 140 for purchase of items from the retailer, and the process ends at block 240.

However, if in block 218 the purchase amount is found to be greater than the remaining monetary balance of the gift card 140 the process is directed to block 224 where the monetary balance of the gift card 140 is deducted from the purchase amount to determine a balance owing to the retail outlet. In block 226 a discount is established to be applied against the balance owing and the balance owing is discounted by the discount amount in block 228. The discount can be a set percentage, such as ten percent, or the retailer can offer a tiered discount whereupon the discount percentages increase as the balance owing amount increases. For example, a ten percent discount can be offered for balances owing of 0-25 dollars, a fifteen percent discount offered for balances owing of 25-50 dollars and so on. Alternatively, a fixed dollar discount can be offered for balances owing beyond a fixed balance owing. The particular discount and how the discount is applied is at the discretion of the retailer with the intent being that the offer of a discount for balances owing will act as an incentive to the user of the gift card 140 to purchase items having a sales price that exceeds the monetary value of the gift card 140. Once the discount has been applied to the balance owing, the user of the gift card 140 pays the discounted balance owing in block 230.

In block 232 the user of the gift card 140 can be offered the opportunity to replenish a desired balance on the gift card 140. If the user does not wish to replenish gift card 140, the process is directed to block 240 and ends. However, if the user elects to replenish the monetary value of the gift card 140, the process proceeds to block 234 where the user tenders a desired amount of money to add to the balance of the gift card 140. In block 236 the new monetary balance of the gift card 140 is stored in the database in storage medium 114 until the data is required when the gift card 140 is again used. The process ends at block 240 until such time as the user again desires to use the gift card 140 and the process again restarts at block 202. Every time the user offers the gift card 140 as payment for a purchase and the purchase amount is greater than the monetary value of card 140, the retailer can offer a discount to be deducted from the balance owing as an incentive for the customer/user to continue replenishing the gift card 140 and returning to purchase merchandise from retail outlet 120.

Figure 3:
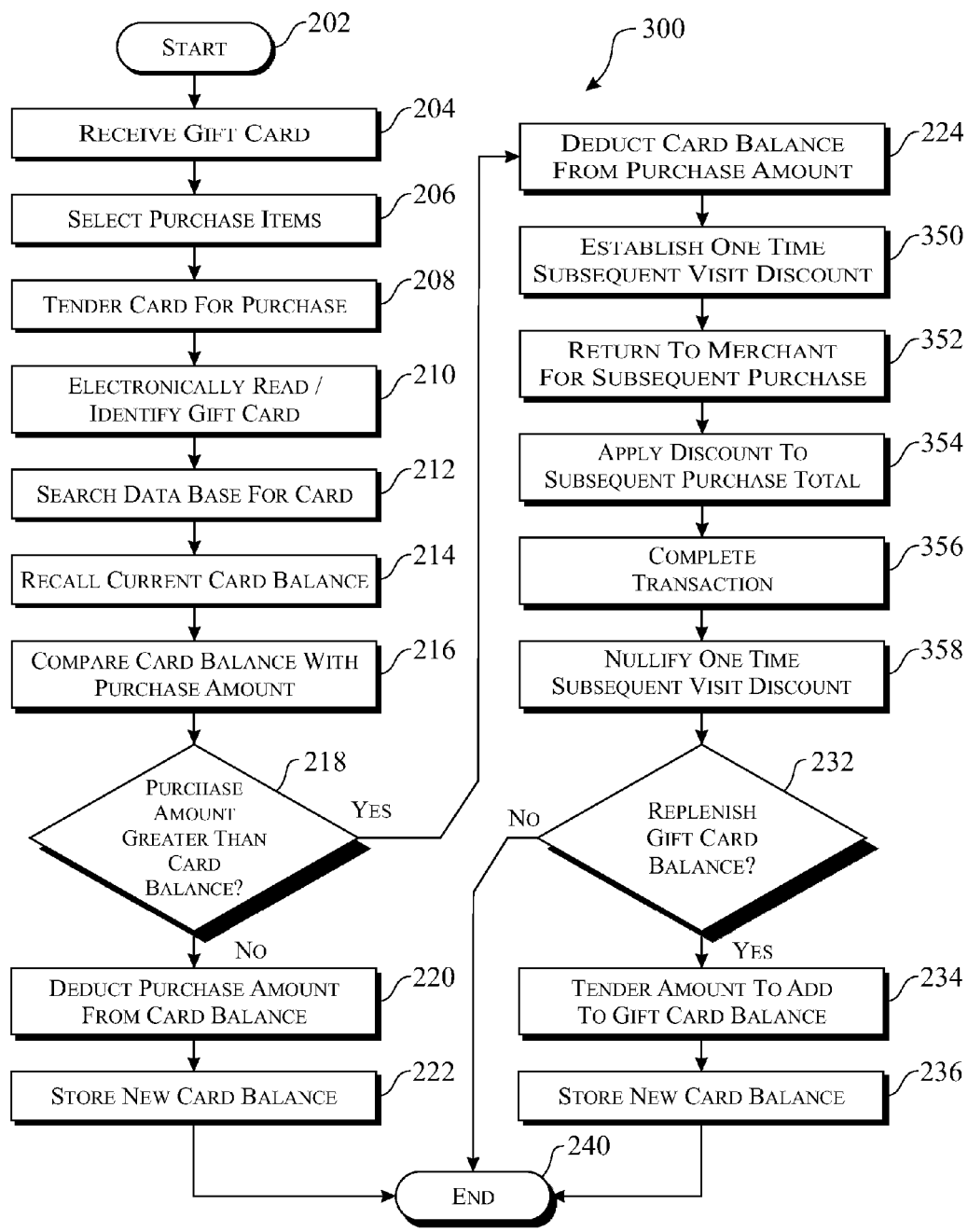
FIG. 3 presents a block diagram representative of a method of redeeming a gift card to incentivize a consumer to return to the merchant for subsequent purchases.

An exemplary redemption process 300 utilizing gift card redemption system 100 presented in the illustration in FIG. 3. The exemplary redemption process 300 is shown illustrating the redemption of the gift card 140 incentivized with offering an added discount for purchases made during a subsequent visit. The redemption process 300 commences with a series of steps as previously taught in FIG. 2. The process is directed to incentivize the consumer to return to the merchant for a subsequent purchase. The process deviates from the redemption process 200 during transaction completion steps. In this embodiment, the gift card 140 having a depleted value (step 224) is subsequently converted into a discount coupon for use during a future visit to the merchant. In step 350, a one time, subsequent visit discount is established. The one time subsequent discount is established and subsequently associated with the gift card 140 when said associated monetary card balance is depleted. The one time subsequent discount is identified by data saved on either the storage media 142 integrated with the gift card 140 or remotely on the storage medium 114 within the respective merchant service system 110. It is understood that the system can store any predetermined quantity of subsequent discounts for future use. In a configuration that utilizes a plurality of subsequent discounts, the system can include a step of reducing the quantity of subsequent discounts as each discount is applied to a purchase. The cardholder returns to the merchant at a future point in time in accordance with block 352. The consumer selects merchandise and/or services offered by the merchant for purchase. During a transaction execution step, the merchant applies the one time, subsequent visit discount to the total purchase amount during block 354. The transaction is completed with the consumer providing a means for payment for the total, reduced amount due as prescribed in block 356. In parallel, the subsequent visit discount is nullified as directed in block 358 ensuring a one-time application of the subsequent visit discount. The process continues returning to block 232, offering the consumer the ability to replenish the gift card 140.

The process can include a step of collecting the gift card 140 from the user when the gift card 140 has a depleted value.

Figure 4:
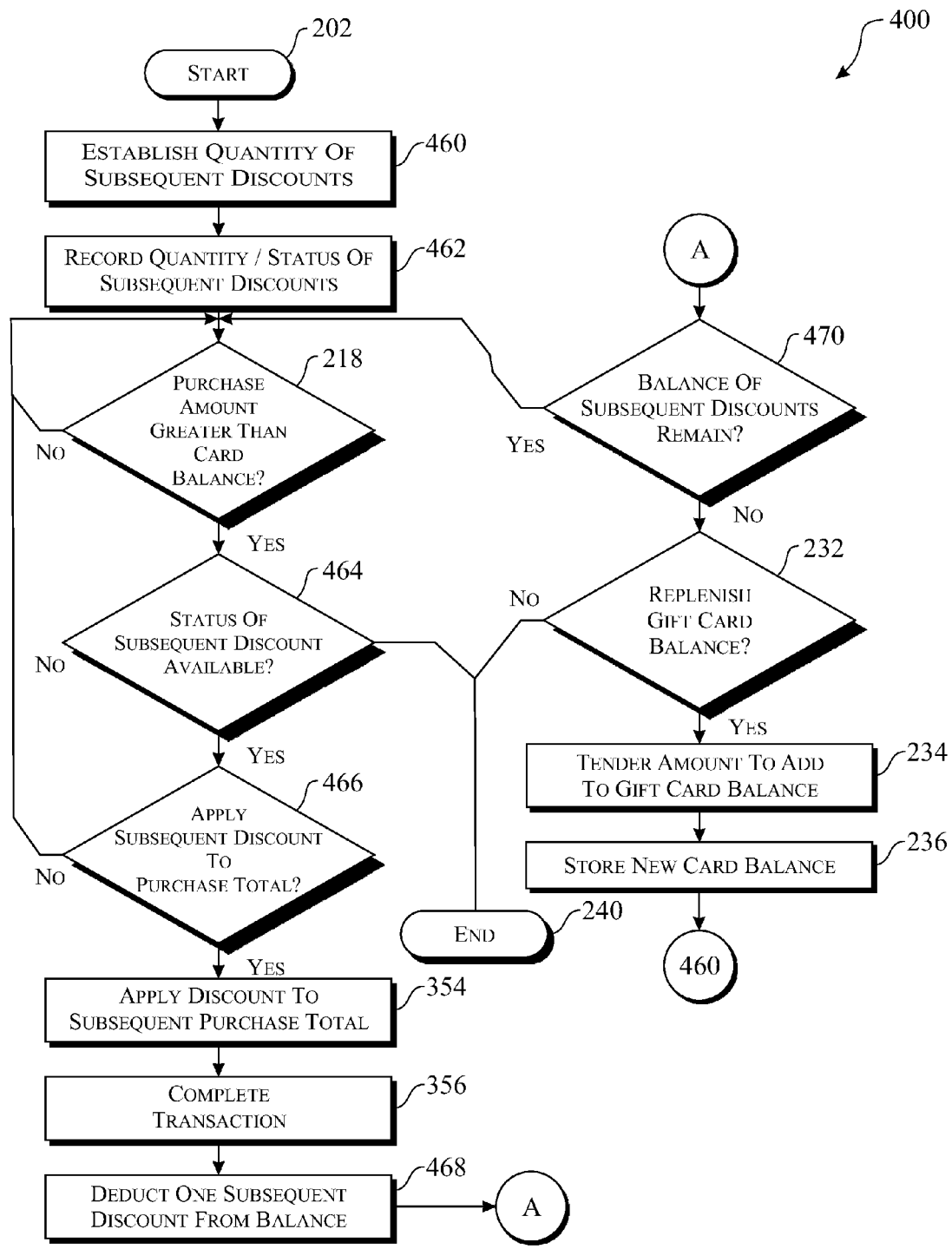
FIG. 4 presents a block diagram representative of a method of replenishing a gift card balance onto a gift card upon depletion of subsequent discounts.

An exemplary modified redemption process 400 utilizing gift card redemption system 100 presented in the illustration in FIG. 4. The process is directed to incentivize the consumer to return to the merchant for subsequent purchases. The exemplary modified redemption process 400 is shown illustrating the redemption of a gift card 140 incentivized with offering a predetermined quantity of additional discounts for purchases made during subsequent visits. The redemption process 400 commences by establishing a predetermined quantity of subsequent discounts (step 460) for application to purchases made after depletion of a card balance. In one embodiment, the consumer can establish the quantity of subsequent discounts by either selecting certain gift cards 140, purchasing a predetermined quantity of subsequent discounts when procuring the gift card, procuring the card at a certain retailer which would offer a higher quantity of subsequent discounts, and the like. For example, each subsequent discount may be $0.25 each, where the discount may be 10%, 15%, etc. Under those conditions, the consumer would result in a net savings for any purchase over $2.50. Once the quantity of predetermined discounts is established, the quantity is entered into the system and a server records the information (step 462) in storage medium 114. If, in block 218, the purchase amount for the items is not greater than the current monetary balance of card 140, the process is directed to block 220 (not shown in this diagram) where the purchase amount is deducted from the monetary balance of card 140. The new monetary balance of card 140 is stored in storage medium 114 until the next time the user proffers card 140 for purchase of items from the retailer, and the process ends at block 240 (not shown in this diagram). The process continues the same cycle returning to block 218 until the purchase amount exceeds card balance, wherein at which time, the card indicates that a subsequent discount is now applicable (block 464). The system polls the storage medium 114 to determined a quantity of remaining subsequent discounts that are available (block 464). In a condition where the remaining subsequent discounts are depleted, the process ends 240. In a condition where at least one remaining subsequent discount exists, the consumer is asked if they desire to apply a subsequent discount to the purchase (block 466). If the consumer decides to wait to use the subsequent discount, the recorded quantity remains unchanged and the process returns to a point awaiting execution of block 218. If the consumer decides to apply the subsequent discount to the purchase, the merchant applies the subsequent discount to the total purchase amount during block 354. The transaction is completed with the consumer providing payment for the total, reduced amount due as prescribed in block 356. Payment can be provided using cash, credit, a financial transfer, a cash equivalent, and the like. In parallel, the quantity of available subsequent discounts is reduced by a quantity of one as directed in block 468 retaining accurate use of the total number of originally available subsequent discounts. The process continues determining if the quantity of subsequent discounts is depleted (block 470). If a balance shows at least one subsequent discount is still available, then the process returns to a point awaiting execution of block 218. If the subsequent discounts are depleted, the process can suggest that the cardholder replenish the gift card 140 (block 232). The cardholder can decide against replenishing the gift card 140 and the process ends 240. When the cardholder decides to replenish the gift card 140, the process proceeds to block 234 where the user tenders a desired amount of money to add to the balance of gift card 140. In block 236 the new monetary balance of gift card 140 is stored in the database in storage medium 114 until the data is required when gift card 140 is again used. In parallel, a new predetermined quantity of subsequent discounts (step 460) is established for application to purchases made after depletion of the card balance and the process is repeated.

Figure 5:
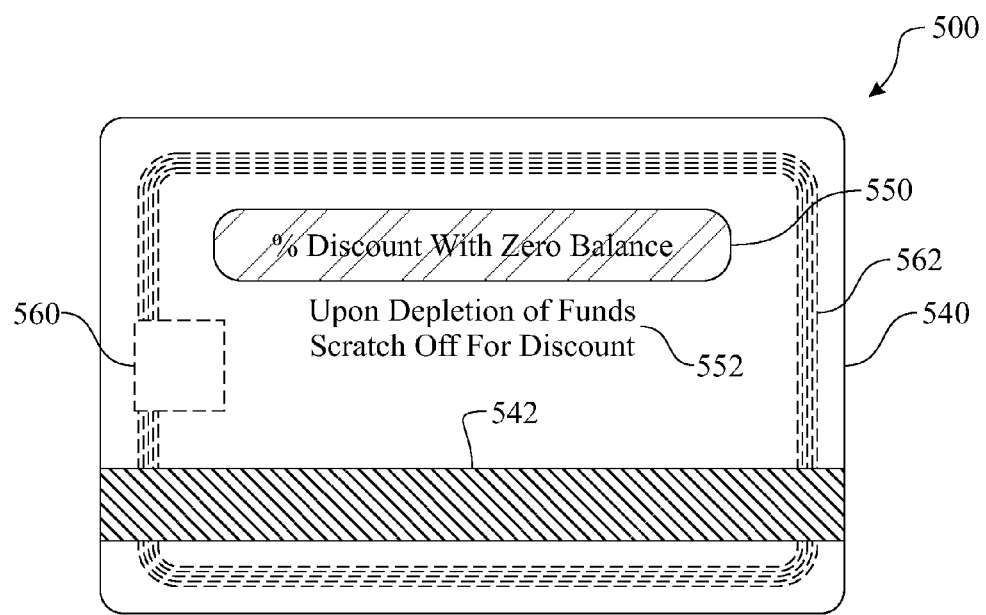
FIG. 5 presents an exemplary gift card comprising an integrated discount identifier.

The above embodiments utilize remotely located searchable storage mediums 114 for use storage and retrieval of the data. In another embodiment, the information can be provided directly upon a storage medium 542, 560 integrated onto a gift card 540 as presented in the exemplary embodiment illustrated in FIG. 5. The gift card substrate 540 can be fabricated of any reasonable material for the application, including plastic, laminated plastic, molded plastic, a composite, such as carbon fiber, metal, and the like. The storage medium can be a magnetic data strip 542, an electronic data medium 560, or any other known storage media. A first exemplary storage medium embodiment utilizes the magnetic data strip 542 is adhesively attached to an exterior surface of the gift card substrate 540. Data can be read from and updated to the magnetic data strip 542 in a manner similar to an audio-cassette tape. The data can include a card balance, a quantity of subsequent discounts that remain available, a retailer name, a card number, and the like. A second exemplary storage medium embodiment utilizes the electronic data medium 560 for obtaining, updating, and storing respective data. The electronic data medium 560 can be accessed using any known means, including a passive wireless interface 562 (as illustrated), a mechanical interface, such as electro-mechanical contacts, and the like. A subsequent balance usage indicator 550 is provided in any one-time use configuration, such as a scratch off panel, wherein the merchant adheres to directions for use upon depletion of monetary balance 552 printed upon the gift card substrate 540.

In use, the merchant would retrieve any remaining balance from the storage medium 542, 560 on the gift card 500. When the monetary balance is depleted, the merchant could then apply the one time subsequent discount to the purchase. Should the consumer elect to wait, the consumer simply retains the gift card 500. Where the consumer elects to apply the subsequent discount to the purchase, the merchant reduces the sales total accordingly. The merchant then follows the directions for use upon depletion of monetary balance 552 to indicate that the subsequent discount has been used. In the physical embodiment, the merchant removes the scratch off coating applied onto the subsequent balance usage indicator 550. It is understood that where multiple subsequent discounts may be offered, the subsequent discount gift card 500 would include a plurality of subsequent balance usage indicators 550; one subsequent discount gift card 500 for each respective subsequent discount. In the electronic embodiment, the merchant revises the recorded data within the storage medium 542, 560 using a method and equipment respective to the selected storage medium 542, 560. The electronic format enables the consumer the ability to replenish the monetary value as well as the quantity of available subsequent discounts.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method of redeeming a gift card having an associated programmed monetary value and incentivizing a user to purchase goods and services from a merchant in an amount exceeding said programmed monetary value, said method including the steps of:
   obtaining a gift card;
   establishing an associated monetary card balance of said gift card, wherein said associated monetary card balance is recorded in a database provided on a storage medium accessible via a respective merchant service system;
   determining a purchase amount of a user's desired purchase during a checkout process using transaction software hosted by said merchant;
   reading an identity of said gift card presented by a user;
   recalling a monetary card balance associated with said gift card by one of obtaining said associated monetary card balance stored within a storage media integrated with said gift card and obtaining said associated monetary card balance associated with said gift card by submitting a reference associated with said gift card and contacting said respective merchant service system;
   comparing said determined purchase amount with said associated monetary card balance;
   revising said recorded associated monetary card balance in said database by electronically communicating with said respective merchant service system, wherein said recorded associated monetary card balance is reduced by the lower of said purchase amount of a user's desired purchase and said associated monetary card balance;
   in a condition where said purchase amount is greater than said associated monetary card balance, said transaction software hosted by said merchant calculates a balance owing in excess of said associated monetary card balance;
   discounting said calculated balance owing by a predetermined percentage, wherein said discounting and balance owing calculations are completed by said transaction software; and
   receiving a secondary form of monetary value from said user for payment of said discounted balance owing.

2. A method of redeeming a gift card as recited in claim 1, said method including the step of:
   applying a replenishment monetary value onto said gift card from said user when said associated monetary card balance is depleted, wherein said replenishment monetary value establishes a new associated monetary card balance.

3. A method of redeeming a gift card as recited in claim 1, said method including the step of:
   collecting said gift card from said user when said associated monetary card balance is depleted.

4. A method of redeeming a gift card as recited in claim 1, said method including the step of:
   establishing a one time subsequent discount that is associated with said gift card, wherein said one time subsequent discount is identified by data saved on one of said storage media integrated with said gift card and remotely within said respective merchant service system.

5. A method of redeeming a gift card as recited in claim 4, said method including the steps of:
   verifying a one time subsequent discount is associated with said gift card;
   applying said one time subsequent discount associated with said gift card to a purchase; and
   revising a status of said one time subsequent discount to indicate that said one time subsequent discount has been used by data saved on one of said storage media integrated with said gift card and remotely within said respective merchant service system.

6. A method of redeeming a gift card as recited in claim 4, said method including the steps of:
   applying a replenishment monetary value onto said gift card from said user when said associated monetary card balance is depleted and after said one time subsequent discount is utilized, wherein said replenishment monetary value establishes a new associated monetary card balance; and
   resetting said status of said one time subsequent discount associated with said gift card to indicate that said one time subsequent discount is available for use.

7. A method of redeeming a gift card as recited in claim 4, said method including the steps of:
   applying a replenishment monetary value onto said gift card from said user when said associated monetary card balance is depleted and after said one time subsequent discount is utilized, wherein said replenishment monetary value establishes a new associated monetary card balance; and
   resetting said status of said one time subsequent discount associated with said gift card to indicate that said one time subsequent discount is available for use.

8. A method of redeeming a gift card as recited in claim 1, said method including the steps of:

establishing a predetermined quantity of subsequent discounts that are associated with said gift card when said associated monetary card balance is depleted, wherein said predetermined quantity of subsequent discounts are identified by data saved on one of said storage media integrated with said gift card and remotely within said respective merchant service system.

9. A method of redeeming a gift card having an associated programmed monetary value and incentivizing a user to purchase goods and services from a merchant in an amount exceeding said programmed monetary value, said method including the steps of:

obtaining a gift card;

establishing an associated monetary card balance of said gift card, wherein said associated monetary card balance is recorded in a database provided on a storage medium accessible via a respective merchant service system;

determining a purchase amount of a user's desired purchase during a checkout process using transaction software hosted by said merchant;

reading an identity of said gift card presented by a user;

recalling a monetary card balance associated with said gift card by one of obtaining said monetary card balance stored within a storage media integrated with said gift card and obtaining said financial value associated with said gift card by submitting a reference associated with said gift card and contacting a respective merchant service system;

identifying a status of a subsequent discount associated with said gift card by one of obtaining said subsequent discount status stored within said storage media integrated with said gift card and obtaining said subsequent discount associated with said gift card by submitting a reference associated with said gift card and contacting said respective merchant service system;

comparing said determined purchase amount with said associated monetary card balance;

revising said recorded associated monetary card balance in said database by electronically communicating with said respective merchant service system, wherein said recorded associated monetary card balance is reduced by the lower of said purchase amount of a user's desired purchase and said associated monetary card balance;

in a condition where said purchase amount is greater than said associated monetary card balance, said transaction software hosted by said merchant calculates a balance owing in excess of said associated monetary card balance;

discounting said calculated balance owing by a predetermined percentage, wherein said discounting and balance owing calculations are completed by said transaction software; and receiving a secondary form of monetary value from said user for payment of said discounted balance owing.

10. A method of redeeming a gift card as recited in claim 9, said method including the step of:

applying a replenishment monetary value onto said gift card from said user when said associated monetary card balance is depleted, wherein said replenishment monetary value establishes a new associated monetary card balance.

11. A method of redeeming a gift card as recited in claim 9, said method including the step of:

collecting said gift card from said user when said status of a subsequent discount is established as applied.

12. A method of redeeming a gift card as recited in claim 9, wherein the step of identifying a status of a subsequent discount includes a step of identifying a quantity of remaining available subsequent discounts.

13. A method of redeeming a gift card as recited in claim 12, said method including the steps of:

verifying said status of said subsequent discount associated with said gift card as being available;

applying said subsequent discount associated with said gift card to a purchase; and revising a status of said subsequent discount to reduce said number of available subsequent discounts by one by updating data saved on one of said storage media integrated with said gift card and remotely within said respective merchant service system.

14. A method of redeeming a gift card as recited in claim 9, said method including the steps of:

applying a replenishment monetary value onto said gift card from said user when said associated monetary card balance is depleted and after said one time subsequent discount is utilized, wherein said replenishment monetary value establishes a new associated monetary card balance; and resetting said status of said one time subsequent discount associated with said gift card to indicate that said one time subsequent discount is available for use.

15. A method of redeeming a gift card having an associated programmed monetary value and incentivizing a user to purchase goods and services from a merchant in an amount exceeding said programmed monetary value, said method including the steps of:

obtaining a gift card having an associated monetary card balance;

establishing an associated monetary card balance of said gift card, wherein said associated monetary card balance is recorded in a database provided on a storage medium accessible via a respective merchant service system;

reducing said associated monetary card balance of said gift card respective to each transaction until said value of said associated monetary card balance is zero, wherein each transaction using gift card is deducted from said recorded associated monetary card balance and said recorded associated monetary card balance is revised to reflect an associated current monetary card balance recorded in said database provided on said storage medium accessible via a respective merchant service system;

determining a purchase amount of a user's desired purchase during a checkout process using transaction software hosted by said merchant;

reading an identity of said gift card presented by a user;

recalling said current monetary card balance associated with said gift card by one of obtaining said associated monetary card balance stored within storage media integrated with said gift card and obtaining said associated current monetary card balance associated with said gift card by submitting a reference associated with said gift card and contacting said respective merchant service system;

identifying a status of a subsequent discount associated with said gift card by one of obtaining said subsequent discount status stored within said storage media integrated with said gift card and obtaining said subsequent discount associated with said gift card by submitting a reference associated with said gift card and contacting said respective merchant service system;

determining if said revised associated current monetary card balance associated with said gift card is zero;

discounting a purchase amount by subtracting a predetermined percentage from said purchase amount to determine a discounted balance owing, wherein said discount is applied only when said monetary card balance associated with said gift card is zero; and receiving a secondary form of monetary value from said user for payment of said discounted balance owing.

16. A method of redeeming a gift card as recited in claim 15, said method including the step of:

applying a replenishment monetary value onto said gift card from said user when said associated monetary card balance is depleted, wherein said replenishment monetary value establishes a new associated monetary card balance.

17. A method of redeeming a gift card as recited in claim 15, said method including the step of:

collecting said gift card from said user after said subsequent discount is applied to said purchase amount.

18. A method of redeeming a gift card as recited in claim 15, wherein the step of identifying a status of a subsequent discount includes a step of identifying a quantity of remaining available subsequent discounts.

19. A method of redeeming a gift card as recited in claim 18, said method including the step of:

revising a status of said subsequent discount to reduce said number of available subsequent discounts by one by updating data saved on one of said storage media integrated with said gift card and remotely within said respective merchant service system.

\* \* \* \* \*